(12) United States Patent
Charpentier

(10) Patent No.: US 7,556,137 B2
(45) Date of Patent: Jul. 7, 2009

(54) PREFORM-SUPPLY DEVICE COMPRISING A DEVICE FOR THE SELECTIVE REMOVAL OF INCORRECTLY-POSITIONED LONGITUDINAL PREFORMS

(75) Inventor: Alain Charpentier, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 278 days.

(21) Appl. No.: 10/583,944

(22) PCT Filed: Dec. 3, 2004

(86) PCT No.: PCT/EP2004/053258

§ 371 (c)(1), (2), (4) Date: Jul. 24, 2006

(87) PCT Pub. No.: WO2005/070793

PCT Pub. Date: Aug. 4, 2005

(65) Prior Publication Data

US 2008/0226763 A1   Sep. 18, 2008

(30) Foreign Application Priority Data

Dec. 23, 2003 (FR) .................................. 03 51172

(51) Int. Cl.
B65G 43/08 (2006.01)
B65G 47/14 (2006.01)
(52) U.S. Cl. ..................... 198/395; 198/389; 198/369.7
(58) Field of Classification Search .............. 198/369.7, 198/389, 396, 398, 395, 358; 209/707
See application file for complete search history.

(56) References Cited

U.S. PATENT DOCUMENTS

| 2,252,498 | A | * | 8/1941 | Flaws, Jr. ...................... 221/14 |
| 2,936,869 | A |   | 5/1960 | Draudt et al. |
| 3,054,170 | A | * | 9/1962 | Benichasa et al. ............. 29/810 |
| 3,506,840 | A | * | 4/1970 | Fink ........................ 250/223 B |
| 3,730,325 | A | * | 5/1973 | Goodwin ..................... 198/395 |
| 4,162,012 | A |   | 7/1979 | Kupper |
| 4,223,778 | A | * | 9/1980 | Kontz .......................... 198/389 |
| 4,418,482 | A | * | 12/1983 | Aidlin et al. .................. 34/435 |
| 4,549,662 | A |   | 10/1985 | Schoenig |

(Continued)

FOREIGN PATENT DOCUMENTS

WO    WO 02/36466 A    5/2002

Primary Examiner—Mark A Deuble
(74) Attorney, Agent, or Firm—Young & Thompson

(57) ABSTRACT

A system of feeding preforms, particularly designed to feed a machine for blow molding receptacles such as bottles, includes, from upstream to downstream in the longitudinal direction of travel of the preforms, at least one sorting and alignment device whose top end is fed with jumbled preforms and whose bottom end includes at least two alignment rollers, substantially parallel and rotated about their respective axis, designed to position the preforms in conveyor rails, inclined relative to the horizontal, to convey them to the machine, and of the type including, upstream of the machine, a filtering element to discard the incorrectly positioned performs. The filtering element includes, downstream of the alignment rollers, at least one selective discarding device of the preforms called lying preforms, that is to say those that arrive from the rollers on the rails lying down and oriented longitudinally and that extend generally longitudinally on the conveyor rails.

13 Claims, 3 Drawing Sheets

U.S. PATENT DOCUMENTS

| | | | |
|---|---|---|---|
| 4,717,026 A | 1/1988 | Fischer et al. | |
| 4,819,784 A * | 4/1989 | Sticht | 198/395 |
| 5,186,307 A * | 2/1993 | Doudement et al. | 198/454 |
| 6,575,305 B1 * | 6/2003 | Casagrande | 209/616 |

* cited by examiner

PREFORM-SUPPLY DEVICE COMPRISING A DEVICE FOR THE SELECTIVE REMOVAL OF INCORRECTLY-POSITIONED LONGITUDINAL PREFORMS

The invention relates to a system of feeding preforms, particularly designed to feed a machine for blow moulding receptacles, comprising enhanced filtering means for discarding the incorrectly positioned preforms.

The feeding system will be more particularly described in the context of its application in an installation for the blow moulding or stretch-blow moulding of preforms made of PET (polyethylene terephthalate) for the manufacture of receptacles, particularly of hollow receptacles such as bottles or flasks.

Specifically, according to a known technique, such receptacles are usually produced in two steps. In a first step, a preform is injection-moulded in PET and in a second step, the preform is directly or indirectly blow-moulded.

Currently, the preforms are most frequently manufactured by injection with the aid of a first machine then are blow-moulded to the final shape of the receptacle with the aid of a second machine, on a specific blow moulding machine. Such a technology makes it possible, for example, to carry out the blow moulding operation as close as possible to the bottling location, the injection operation being able to be carried out in any location.

In such cases where the injection machine and the blow moulding machine are two totally independent machines, the installation comprising the blow moulding machine then usually has a preform feeding system.

Document WO-A-02/36466 describes an example of a preform feeding system according to the prior art.

FIG. 1 of this document represents schematically a preform feeding system of conventional type designed to feed a machine for blow moulding receptacles.

In such a system, the preforms are most frequently tipped in a jumble into a bin or hopper of the feeding system.

The preforms are picked out of this bin by an elevator conveyor which, in its turn, tips the preforms, at a pre-established rate, at the top end of a sorting and alignment device. This device usually comprises two alignment rollers that are inclined relative to the horizontal and that are substantially parallel with one another. The two rollers are rotated in opposite directions, and are spaced from one another in order to allow a gap to subsist between the two rollers, along the two rollers, that is of a dimension slightly greater than the dimension of the body of the preforms. However, the spacing of the two alignment rollers is such that the transverse space between the two rollers is less than the dimension of the supporting collar situated at the base of the neck of the preform.

The device is configured in such a manner that, under the effect of gravity, the preforms are forced to the bottom of the device, that is to say its part where the two rollers lie. Thus, simply by gravity, each preform tends to place itself in the device, between the two rollers, so as to be held supported by its collar on the rollers while having the body hanging down between the two rollers. The rotary motion of the rollers and their inclination, on the one hand, places the preforms one after the other, in the preferred position described hereinabove, and, on the other hand, slides the preforms along the longitudinal axis of the rollers, towards the outlet of the device where they are collected in a routing channel formed by conveyor rails connected, for example, to the blow moulding machine. In the conveyor rails, the preforms thus accumulate preferably in a continuous line.

However, because the preforms are tipped in a jumble into the sorting and alignment device, and because of the random character of the placement of the preforms, certain of them may arrive at the outlet without having been able to be positioned correctly between the two rollers.

Operating tests have in particular made it possible to identify the various incorrect positions that the preforms in such a system are likely to occupy.

Naturally, such incorrectly positioned preforms must in no circumstances reach the machine. This is why preform feeding systems comprise filtering means, such as an ejection wheel, designed to discard these preforms.

In order to enhance, in the feeding systems, the discarding of these incorrectly positioned preforms, document WO-A-02/36466 proposes to use as a filtering means an ejection wheel that is arranged above the alignment rollers in order to eject the incorrectly positioned preforms, more particularly the preforms of the "nested upright" type, that is to say that are nested vertically in one another.

However, such an ejection wheel does not give entire satisfaction because it does not manage to eliminate all the types of incorrectly positioned preforms and therefore does not make it possible to achieve a feeding system that is totally reliable.

It has been notably determined that certain preforms may be incorrectly positioned so as to occupy an incorrect position in which the preform is lying down and oriented longitudinally, that is to say extends parallel to the axes of the rollers or to the conveyor rails.

Specifically, such a preform, called a lying preform, is not discarded by the current filtering means, particularly by an ejection wheel according to document WO-A-02/36466, and is consequently likely to be conveyed by the rails to the machine where it risks causing damage in the installation. Naturally, such a lying preform may be alone or else nested with at least one other lying preform.

In addition, the presence of these lying preforms may cause blockages that can bring about interruptions of the line of conveyed preforms, even lead to a stoppage of the feeding of the preforms, and hence to a stoppage of the blow moulding machine due to a lack of preforms.

Naturally, such stoppages are not desirable because they may cause the stoppage of the bottling line situated downstream of the blow moulding machine.

The objective of the invention is therefore to propose a new selective discarding device designed to deal specially with this type of incorrectly positioned preforms and suitable to being applied, most particularly but not exclusively, in a preform feeding system such as that described in document WO-A-02/36466.

For this purpose, the invention proposes a system of feeding preforms, particularly designed to feed a machine for blow moulding receptacles such as bottles, of the type comprising, from upstream to downstream in the longitudinal direction of travel of the preforms, at least one sorting and alignment device whose top end is fed with jumbled preforms and whose bottom end comprises at least two alignment rollers, substantially parallel and rotated about their respective axis, that are designed to position the preforms in conveyor rails, inclined relative to the horizontal, to convey them to the machine, and of the type comprising, upstream of the machine, filtering means to discard the incorrectly positioned preforms, characterized in that the filtering means comprise, downstream of the alignment rollers, at least one selective discarding device arranged to discard the preforms called lying preforms, that is to say those that arrive singly or else nested, from the rollers on the rails lying down and oriented longitudinally and that extend generally longitudinally on the conveyor rails.

Also for this purpose, the invention proposes a system of feeding preforms, particularly designed to feed a machine for blow moulding receptacles such as bottles, of the type comprising, from upstream to downstream in the longitudinal direction of travel of the preforms, at least one sorting and alignment device whose top end is fed with jumbled preforms and whose bottom end comprises at least two alignment rollers, substantially parallel and rotated about their respective axis, that are designed to position the preforms in conveyor rails, inclined relative to the horizontal, to convey them to the machine, and of the type comprising, upstream of the machine, filtering means to discard the incorrectly positioned preforms, characterized in that the filtering means comprise, downstream of the alignment rollers, at least one selective discarding device arranged to discard the preforms called lying preforms, that is to say those that arrive singly or else nested, from the rollers on the rails lying down and oriented longitudinally and that extend generally longitudinally on the conveyor rails, and in that the selective discarding device comprises movable discarding means that are controlled in movement by a driven actuator.

Thanks to the feeding system according to the invention, the reliability of such systems is enhanced by dealing systematically with the various cases of incorrectly positioned preforms and more particularly that of the lying preforms.

Surprisingly, it has also been noted that the system according to the invention makes it possible to considerably reduce the length of the rollers relative to those found in the known systems.

Advantageously, a feeding system according to the teachings of the invention may be applied in automated installations comprising machines with very high rates, that is to say capable, for example, of blow moulding more than 40 000 receptacles per hour.

According to other features of the invention:
the selective discarding device comprises movable discarding means that are controlled in movement by a driven actuator;
the selective discarding device comprises detection means capable of supplying to the actuator a detection signal representative of the presence on the rails of at least one lying preform;
the detection means comprise at least one sensor that is arranged at a determined height above the rails in order to identify a lying preform depending on the position of its radial collar;
the movable discarding means consist of at least one section of movable rail that is capable, when a lying preform is detected, of being moved by the actuator between a position of conveying the preforms and a retracted discarding position in which the preforms are discarded to recovery and/or recirculation means;
the section of rail is mounted so as to move in translation outwards in a transverse direction so as to form a trap door which, in the retracted position, causes all the preforms that are on the movable section of rail to fall by gravity;
the system comprises means for stopping the line of preforms situated upstream of the mobile discarding means when a lying preform is detected;
the stopping means consist of at least one stopping arm that is mounted so as to pivot between a retracted rest position and a stopping position in which a portion of the arm interacts with a portion of the neck of a preform, called the leading preform, in order to immobilize the line of preforms situated upstream of the movable section of rail when it is moved to its retracted discarding position;
the stopping portion of the arm comprises a curved profile designed to come into contact tangentially with the neck of the leading preform;
the filtering means comprise at least one ejection wheel designed to eject other types of incorrectly positioned preforms, such as the preforms in the "nested upright" position, that is arranged upstream of the device for selectively discarding the lying preforms.

Other features and advantages of the invention will appear on reading the following detailed description and on seeing the drawings in which.

In the following description, identical reference numbers indicate parts that are identical or have similar functions.

By convention, and in a non-limiting manner, the terms "downstream" or "upstream" and the directions "longitudinal", "transverse" or "vertical" will be used to indicate respectively elements or positions relative to the direction of travel of the preforms and according to the trihedral (L, V, T) shown in the figures.

Figure 1:
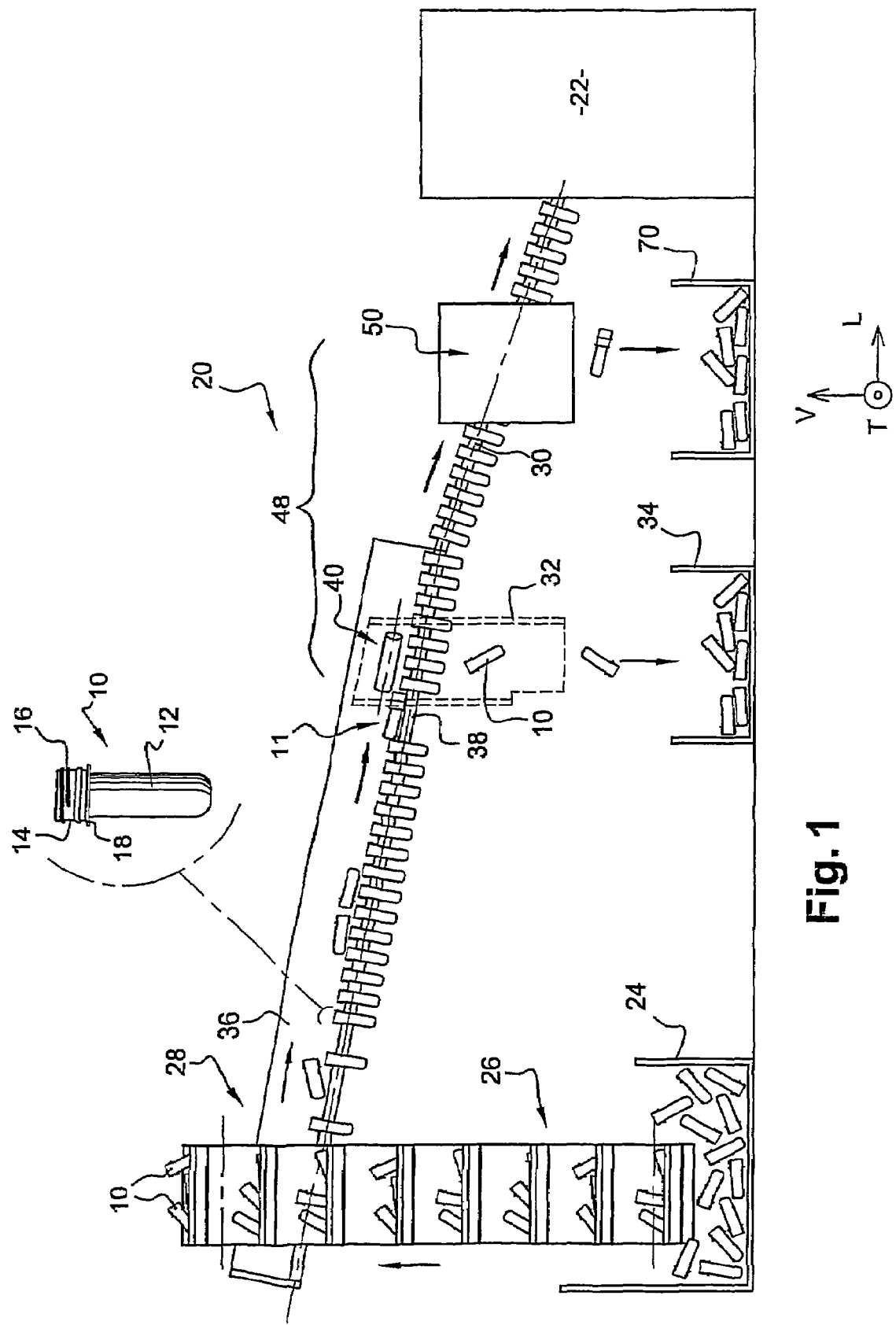
FIG. 1 is a schematic side view of a preform feeding system comprising a device according to the invention to selectively discard from the line the incorrectly positioned preforms of the lying type.

FIG. 1 shows in a very schematic manner a system 20 for feeding preforms according to the prior art comprising, according to the invention, a device for the selective discarding of the lying preforms.

An enlargement illustrates in detail an example of a preform 10 likely to be used in such a feeding system 20.

In a known manner, such a preform 10 comprises a substantially tubular body 12 that is closed at one of its axial ends and has, at its other end, a neck 14 having the definitive shape of the neck of the final receptacle.

The neck 14 of the preform 10 comprises a thread 16 and an annular supporting collar 18 which extends, at the base of the neck, radially outwards.

Such a feeding system 20 is for example designed to feed a blow moulding machine 22 with preforms 10.

The feeding system 20 comprises upstream a storage bin 24 or hopper in which the preforms 10 are stored in a jumble. An elevator 26 makes it possible to pick the preforms 10 from the storage bin 24 in order to tip them at the top end of a sorting and alignment device 28. In this sorting and alignment device 28, the preforms 10 are oriented with the neck 14 upwards and are aligned in a line so as to be subsequently delivered downstream to conveyor rails 30 that transport the preforms 10 to a machine, such as the blow moulding machine 22.

The means of feeding the conveyor rails 30 consisting of the storage bin 24, the elevator 26 and the sorting and alignment device 28 are given as examples only and are in no way limiting.

The system 20 preferably comprises means of recovering the incorrectly positioned preforms that are ejected; specifically the preforms 10 that have not been damaged during this operation may advantageously be reused in the system 20.

The recovery means consist, for example, of a recovery hopper 32 whose bottom end communicates with a recovery bin 34 into which fall the incorrectly positioned preforms 10 that have been ejected.

As a variant, the recovery means comprise a recirculation belt which makes it possible to return the ejected preforms to the storage bin 24. However, although such a recirculation belt makes it possible to automate the processing of the ejected preforms, it has the risk of reinserting into the feeding system preforms that are in particular in the nested position.

In a known manner, the sorting and alignment device 28 consists of a coffer comprising, for example, two vertical side walls 36. The bottom of the coffer is formed by two rollers 38 with substantially parallel axes A1 and A2 that extend substantially along the whole length of the coffer. The axes A1 and A2 are inclined relative to the horizontal at a slope matching the slope of inclination of the sorting and alignment device 28.

Figure 2:
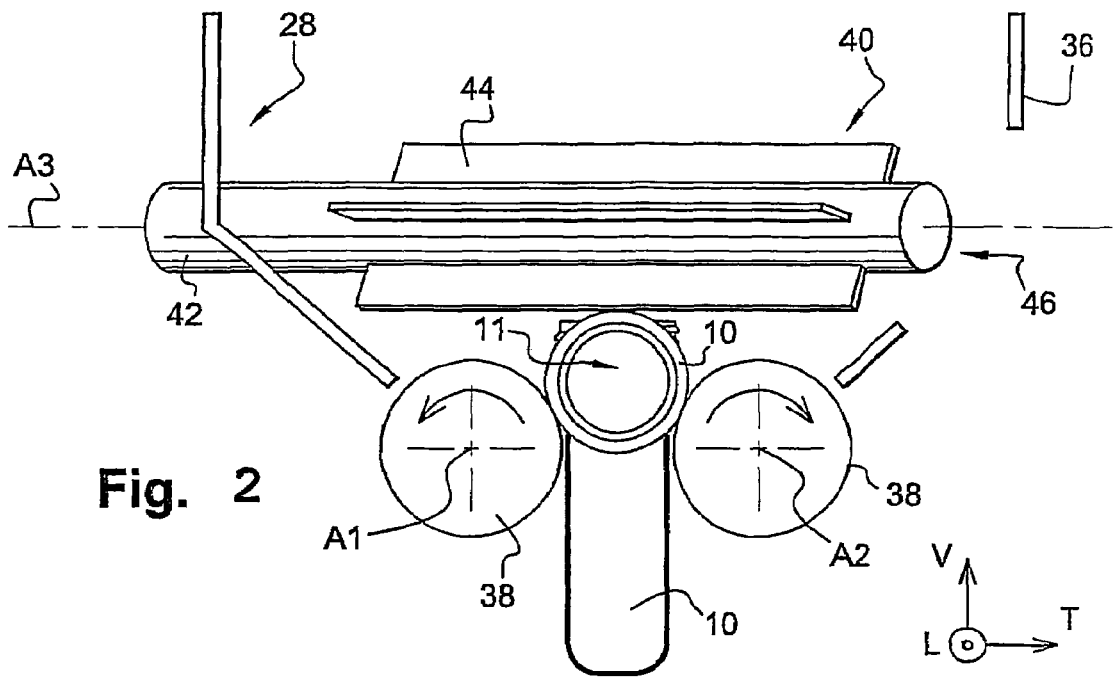
FIGS. 2 and 3 are partial views of the system according to FIG. 1 which illustrate schematically in cross section and in a top view respectively, a lying preform that is not likely to be discarded by filtering means such as the ejection wheel.
Figure 3:
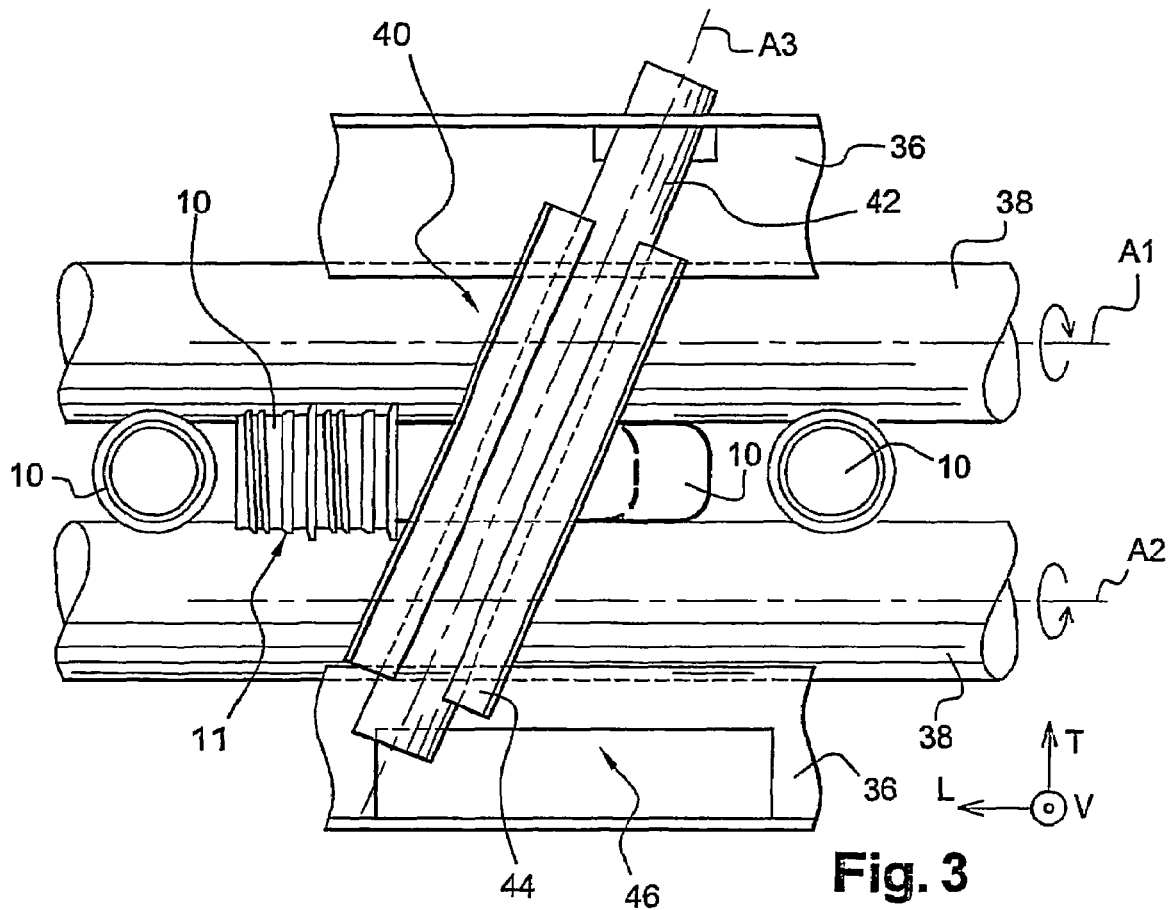

As can be seen in FIGS. 2 and 3, the two rollers 38 are separated from one another in order to allow a space to subsist between them whose transverse dimension is slightly greater than the diameter of the body 12 of the preform 10 of the type represented in FIG. 1.

Thus, the diameter of the outer radial collar 18 of the neck 14 of the preform 10 is greater than the transverse dimension of the space separating the two rollers 38. In this way, when a preform 10 presents itself on the rollers 38, its body 12 can fall into the space between the two rollers 38 but it is then held by the collar 18 and respectively aligned in a substantially vertical position and oriented with the neck 14 upwards.

To promote the correct positioning of the preform 10, each roller 38 is driven in a rotary motion about its respective axis A1 or A2. The two rollers 38 rotate in opposite directions from one another, either in the direction indicated in the figures, or each in the contrary direction.

To ensure that all the preforms tipped into the sorting and alignment device 28 come into contact with the rollers 38, it can be seen in FIG. 2 that the bottom portion of the side walls 36 of the coffer is formed by inclined faces that bring all the preforms towards the centre of the hopper, onto the rollers 38.

The sorting and alignment device 28 is advantageously fitted with filtering means to discard the incorrectly positioned preforms. The filtering means here comprise an ejection wheel 40 forming a first device for discarding the incorrectly positioned preforms.

The ejection wheel 40 makes it possible to remove the preforms 10 which, on arriving close to the bottom end of the sorting and alignment device 28, have not been oriented and aligned between the two rollers 38.

The ejection wheel 40 essentially comprises a central shaft 42 which extends in a plane parallel to the plane defined by the two axes A1 and A2 of the two alignment rollers 38, vertically above this plane. Advantageously, the axis A3 of the central shaft 42 of the ejection wheel 40 is inclined relative to a perpendicular to the direction of the axes A1 and A2, for example of the order of 45°.

The inclination of the axis A3 is a function of the travelling speed of the preforms 10 in the sorting and alignment device 28, that is to say according to the geometry and the feeding rate of the system, this angle may therefore, for example, vary between 20° and 75°.

The shaft 42 is connected to a system such as an independent motor (not shown) for rotation about its axis A3, that drives it at a speed of the order, of for example, 250 revolutions per minute.

The shaft 42 is furnished with radial paddles 44 that, in this instance, are four in number distributed angularly in an even manner about the axis A3, and that are, for example, made of flexible elastomer.

The paddles 44 extend along the axis A3 so as to sweep, when the ejection wheel 40 is rotated about its axis A3, substantially all the transverse space situated above the rollers 38 in the hopper 28.

As a variant, the paddles 44 could be replaced by flexible radial threads, the ejection wheel 40 then taking the form of a rotary brush.

Opposite the ejection wheel 40, the sorting and alignment device 28 comprises at least one side orifice 46 placed level with the ejection wheel 40, upstream of the latter, relative to the direction of travel of the preforms, designed to make it possible to remove the ejected preforms to the recovery hopper 32.

The vertical positioning of the wheel 40 and the radial dimension of the paddles 44 are chosen so that the wheel 40, rotated about its axis A3, sweeps the space situated immediately above the rollers 38 without coming into contact with the preforms 10 which are correctly oriented between the two rollers 38, that is to say generally vertically.

Thus, the neck 14 of a correctly oriented preform passes beneath the ejection wheel 40, without being touched by the latter.

On the other hand, certain incorrectly positioned preforms will not pass beneath the ejection wheel 40 and will thus be discarded.

Such will be the case particularly of a set of preforms 10 that are in the "nested upright" position, whose top preform will be swept by the ejection wheel 40 and knocked directly towards the side discard orifice 46.

Thus, the ejection wheel 40 makes it possible, by directly ejecting the incorrectly positioned preforms, to prevent an accumulation, in the sorting and alignment device 28, of incorrectly positioned preforms likely to cause many blockages, particularly in the high rate feeders.

However, as can be seen in FIGS. 2 and 3, the ejection wheel 40 does not make it possible to discard systematically all the incorrectly positioned preforms.

More precisely, it is possible that a set 11 of nested preforms, as illustrated in FIGS. 2 and 3, places itself in a position called "lying", that is to say lying down between the rollers 38 and oriented longitudinally so as to extend from the body 12 to the neck 14 generally parallel to the axes A1, A2 of the rollers 38.

Such a set 11 of nested lying preforms will manage to pass beneath the wheel 40, particularly when it is interposed longitudinally between the necks 14 of other preforms 10 that are correctly positioned in the rollers 38. Naturally, the situation is similar whether it is a single lying preform 10 or a set 11 of nested preforms.

Advantageously, such a feeding system 20 must comprise filtering means 48 that are capable of discarding the various types of incorrectly positioned preforms so as to ensure reliable operation of the installation, particularly free of risks of damage or blockage.

According to the invention, the filtering means 48 comprise, downstream of the alignment rollers 38, at least one device 50 for the selective discarding of the preforms 10 called lying preforms, that is to say the preforms that arrive from the rollers on the rails lying down and oriented longitudinally and that extend generally longitudinally on the conveyor rails 30.

The selective discarding device 50 comprises movable discarding means 52 that are controlled in movement by a driven actuator 54 and detection means 56 capable of supplying the actuator 54 with a detection signal representing the presence on the rails of at least one lying preform 10.

The detection means 56 comprise at least one sensor 58 that is arranged at a determined height above the rails 30 so as to identify a lying preform 10 according to the position of its radial collar 18.

Advantageously, the system 20 comprises means for stopping the line of preforms situated upstream of the movable discarding means 52 of the device 50, when a lying preform 10 is detected.

Figure 4:
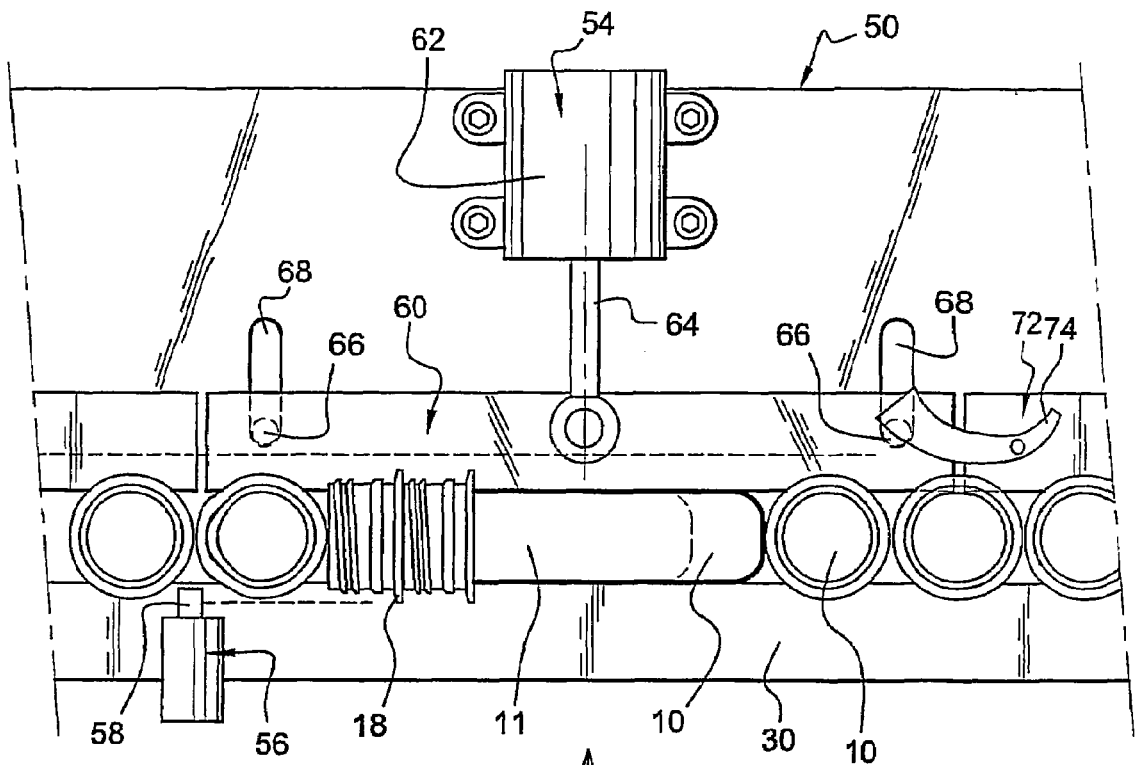
FIGS. 4 and 5 represent schematically top views of a preferred embodiment of a selective discarding device according to the teachings of the invention and illustrate respectively the conveying and retracted discarding positions of the section of movable rail forming the discarding means.
Figure 5:
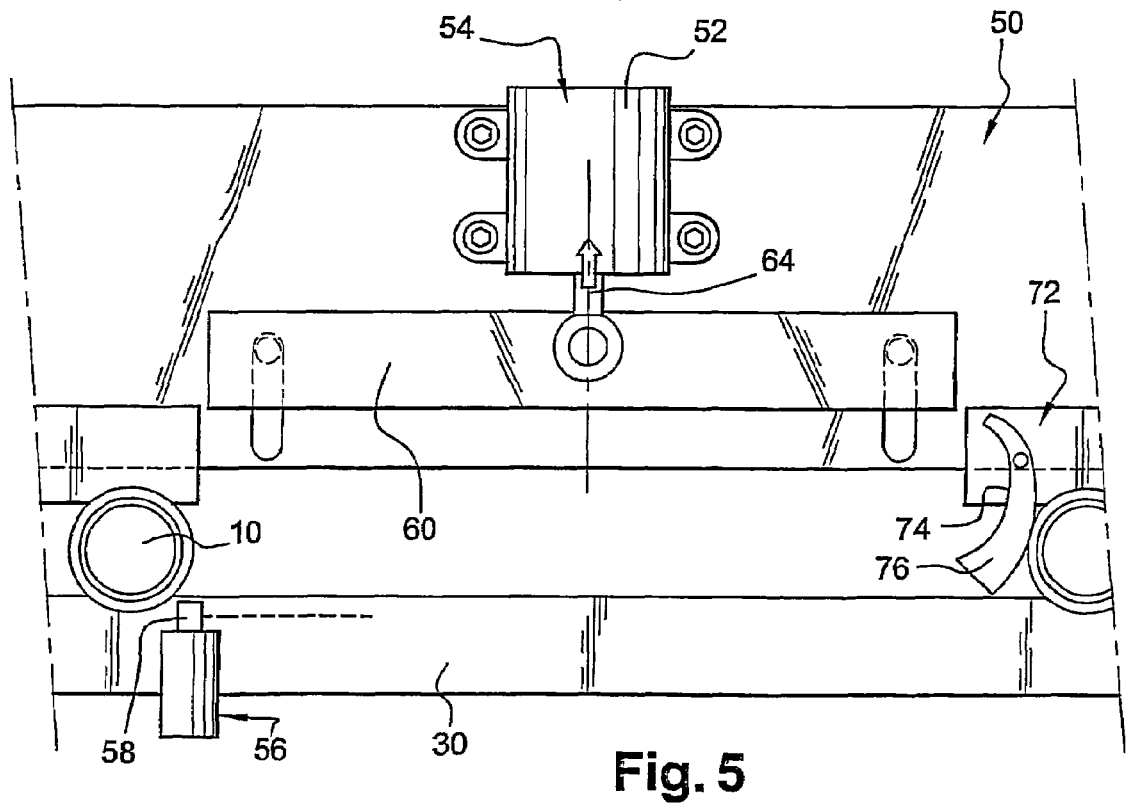

FIGS. 4 and 5 illustrate more particularly a preferred embodiment of such a device 50 for selectively discarding the lying preforms 10.

According to this embodiment, the movable discarding means 52 consist of at least one section 60 of movable rail that is capable, when the lying preform 10 is detected by the sensor 58, of being moved by the actuator 54 to a discarding retracted position.

The actuator 54 of the section 60 of movable rail consists, for example, of a pneumatic or hydraulic cylinder 62 comprising an actuation rod 64 fixedly attached to the section 60.

The section 60 of rail is here mounted so as to be movable in translation, more precisely in a transverse direction and outwards relative to the line of preforms 10 conveyed in the rails 30.

Preferably, the section 60 comprises pins 66 that slide in matching openings 68 so as to form means of guidance in movement of the section 60 between its respective positions for conveyance and retracted for discarding.

The operation of the selective discarding device 50 will now be described in detail hereinafter.

First of all, the sensor 58 detects the presence of the radial collar 18 of the first preform 10 of the set 11 of nested lying preforms. The sensor 58 may, for example, be an optical sensor of the infrared or else mechanical type such as a contractor with which the collar will come into contact.

The sensor 58 is arranged transversely and vertically above the rails 30 so as to detect only the radial collar 18 of the lying preforms 10, specifically the collars 18 of the preforms 10 that are correctly positioned and resting on the top faces of the rails 30 thus pass beneath the sensor 58 without being detected.

When the sensor 58 detects a lying preform, it then provides a detection signal designed to drive the actuator 54.

The signal then controls the actuator 54 so as to cause the movement of the section 60 from the conveying position illustrated in FIG. 4 to the retracted position illustrated in FIG. 5.

The section 60 thus forms a trap door which, in the retracted position, causes all the preforms 10, 11 that are on the section 60 of movable rail to fall by gravity.

Preferably, means of recovery and/or of recirculation, such as another recovery bin 70 shown in FIG. 1, are provided.

Advantageously, the selective discarding device 50 comprises means 72 for stopping the line of preforms situated upstream of the section 60 of movable rail, when the sensor 58 detects a lying preform.

The stopping means 72 are movable and are moved, for example, by an actuator (not shown) that is driven thanks to the detection signal of the sensor 58 so as to synchronize the operation of the various means of the selective discarding device 50.

The stopping means 72 consist here of a stopping arm 74 that is mounted so as to pivot between a retracted rest position illustrated in FIG. 4 and a stopping position illustrated in FIG. 5.

In the stopping position, a part 76 of the arm 74 interacts with a part, such as the neck 14, of the preform 10 called the leading preform, so as to stop the line of preforms situated upstream of the section 60 of movable rail before the actuator 54 causes its movement to its retracted discarding position.

The stopping part 76 of the arm 74 comprises a curved profile designed to come into contact tangentially with the neck 14 of the leading preform. Thanks to this profile, the arm 74 is likely to adapt to various types of preform.

As a variant, the selective discarding section 60 could be mounted mobile in rotation, for example pivoting about a longitudinal axis, so as to discard the lying preforms 10 as previously.

Preferably, the device 50 for selectively discarding the lying preforms is arranged downstream of the ejection wheel 40 so as to act on a stream of preforms that are correctly ordered and stabilized in the rails 30 from which stream the other incorrectly positioned preforms have been discarded.

Thus, the filtering means 48 advantageously comprise at least one ejection wheel 40 designed to eject other types of incorrectly positioned preforms, such as the preforms in the "nested upright" position, that is arranged upstream of the device 50 for selectively discarding the lying preforms.

The invention claimed is:

1. A system (20) of feeding preforms, particularly designed to feed a machine for blow moulding receptacles comprising, from upstream to downstream in the longitudinal direction of travel of the preforms (10), at least one sorting and alignment device (28) whose top end is fed with jumbled preforms (10) and whose bottom end comprises at least two alignment rollers (38), substantially parallel and rotated about their respective axis (A1, A2), that are designed to position the preforms (10) in conveyor rails (30), inclined relative to the horizontal, to convey them to the machine (22), and comprising, upstream of the machine (22), filtering means (48) to discard the incorrectly positioned preforms, whererin the filtering means (48) comprise, downstream of the alignment rollers (38), at least one selective discarding device (50) arranged to discard the preforms (10) called lying singly preforms, that is to say those that arrive from the rollers on the rails lying down and oriented longitudinally and that extend generally longitudinally on the conveyor rails (30), wherein the selective discarding device (50) comprises movable discarding means (52) that are controlled in movement by a driven actuator (54), wherein the movable discarding means (52) consist of at least one section (60) of movable rail that is capable, when a lying preform is detected, of being moved by the actuator (54) between a position of conveying the preforms and a retracted discarding position in which the preforms are discarded to recovery and/or recirculation means (70).

2. A system of feeding preforms according to claim 1, wherein that the selective discarding device (50) comprises detection means (56) capable of supplying to the actuator (54) a detection signal representative of the presence on the rails (30) of at least one lying preform.

3. The system of feeding preforms according to claim 2, wherein the detection means (56) comprise at least one sensor (58) that is arranged at a determined height above the rails (30) in order to identify a lying preform depending on the position of its radial collar (18).

4. The system of feeding preforms according to claim 3, wherein the movable discarding means (52) consist of at least one section (60) of movable rail that is capable, when a lying preform is detected, of being moved by the actuator (54) between a position of conveying the preforms and a retracted discarding position in which the preforms are discarded to recovery and/or recirculation means (70).

5. The system of feeding preforms according to claim 3, further comprises means (72) for stopping the line of preforms (10) situated upstream of the mobile discarding means (52) when a lying preform is detected.

6. The system of feeding preforms according to claim 2, further comprises means (72) for stopping the line of preforms (10) situated upstream of the mobile discarding means (52) when a lying preform is detected.

7. The system of feeding preforms according to claim 6, wherein that the stopping means (72) consist of at least one stopping arm (74) that is mounted so as to pivot between a retracted rest position and a stopping position in which a portion (76) of the arm (74) interacts with a portion of the neck (14) of a preform, called the leading preform, in order to immobilize the line of preforms (10) situated upstream of the movable section (60) of rail when it is moved to its retracted discarding position.

8. The system of feeding preforms according to claim 7, wherein the stopping portion (76) of the arm (74) comprises a curved profile designed to come into contact tangentially with the neck (14) of the leading preform.

9. The system of feeding preforms according to claim 2, wherin the movable discarding means (52) consist of at least one section (60) of movable rail that is capable, when a lying preform is detected, of being moved by the actuator (54) between a position of conveying the preforms and a retracted discarding position in which the preforms are discarded to recovery and/or recirculation means (70).

10. The system of feeding preforms according to claim 2, further comprises means (72) for stopping the line of preforms (10) situated upstream of the mobile discarding means (52) when a lying preform is detected.

11. The system of feeding preforms according to claim 2, further comprises means (72) for stopping the line of preforms (10) situated upstream of the mobile discarding means (52) when a lying preform is detected.

12. The system of feeding preforms according to claim 1, wherein the section (60) of rail is mounted so as to move in translation outwards in a transverse direction so as to form a trap door which, in the retracted position, causes all the preforms that are on the movable section of rail to fall by gravity.

13. The system of feeding preforms according to claim 1, wherein the filtering means (48) comprise at least one ejection wheel (40) designed to eject other types of incorrectly positioned preforms, the preforms in the "nested upright" position, that is arranged upstream of the device (50) for selectively discarding the lying preforms.

* * * * *